(12) United States Patent
Takagi

(10) Patent No.: US 9,619,041 B2
(45) Date of Patent: Apr. 11, 2017

(54) BIOMETRIC AUTHENTICATION APPARATUS AND BIOMETRIC AUTHENTICATION METHOD

(71) Applicant: FUJITSU LIMITED, Kawasaki-shi, Kanagawa (JP)

(72) Inventor: Junji Takagi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/850,048

(22) Filed: Sep. 10, 2015

(65) Prior Publication Data

US 2016/0104029 A1    Apr. 14, 2016

(30) Foreign Application Priority Data

Oct. 9, 2014    (JP) ................. 2014-208089

(51) Int. Cl.
*G06K 9/00* (2006.01)
*G06F 3/01* (2006.01)
*G06F 3/038* (2013.01)

(52) U.S. Cl.
CPC ............ *G06F 3/017* (2013.01); *G06F 3/038* (2013.01); *G06K 9/00006* (2013.01); *G06K 9/00912* (2013.01); *G06F 2203/0338* (2013.01); *G06F 2203/0381* (2013.01); *G06F 2203/04808* (2013.01)

(58) Field of Classification Search
CPC ..... G06F 3/017; G06F 3/041; G06K 9/00006; G06K 9/00912
See application file for complete search history.

(56) References Cited

U.S. PATENT DOCUMENTS

| 8,856,042 B2 * | 10/2014 | Deguchi | G06Q 20/1085 235/379 |
| 2005/0148876 A1 * | 7/2005 | Endoh | A61B 5/117 600/454 |
| 2007/0098223 A1 * | 5/2007 | Kamata | A61B 5/117 382/115 |

(Continued)

FOREIGN PATENT DOCUMENTS

| JP | 2006-011591 | 1/2006 |
| JP | 2007-249797 | 9/2007 |
| JP | 2013-239139 | 11/2013 |

*Primary Examiner* — John Strege
(74) *Attorney, Agent, or Firm* — Fujitsu Patent Center

(57) ABSTRACT

An apparatus performs a biometric authentication by acquiring matching data detected at a time of a biometric authentication and including a matching biometric data, a manner of holding and a posture of a terminal. A processor performs a process including acquiring matching data detected at a time of a biometric authentication and including a matching biometric data, a manner of holding and a posture of the terminal, and performing a matching process. The matching process compares the matching data and registered data including registered biometric data related to manners of holding and postures of the terminal, to extract the registered data including the manner of holding and the posture similar to those included in the matching data, and judge a successful biometric authentication when a similarity of the registered biometric data included in the extracted registered data with respect to the matching biometric data is a threshold value or greater.

10 Claims, 12 Drawing Sheets

(56) References Cited

U.S. PATENT DOCUMENTS

| | | | | |
|---|---|---|---|---|
| 2008/0192989 A1* | 8/2008 | Asano | ............... | G06K 9/00013 |
| | | | | 382/115 |
| 2013/0287268 A1* | 10/2013 | Endoh | ............... | G06K 9/00013 |
| | | | | 382/116 |
| 2013/0300668 A1* | 11/2013 | Churikov | ............... | G06F 3/041 |
| | | | | 345/168 |
| 2015/0069249 A1* | 3/2015 | Alameh | ............... | G01J 1/0407 |
| | | | | 250/341.7 |
| 2015/0379249 A1* | 12/2015 | Liang | ................... | G06F 1/1694 |
| | | | | 726/19 |
| 2016/0026850 A1* | 1/2016 | Mrowiec | ............... | G06F 3/0416 |
| | | | | 345/173 |

* cited by examiner

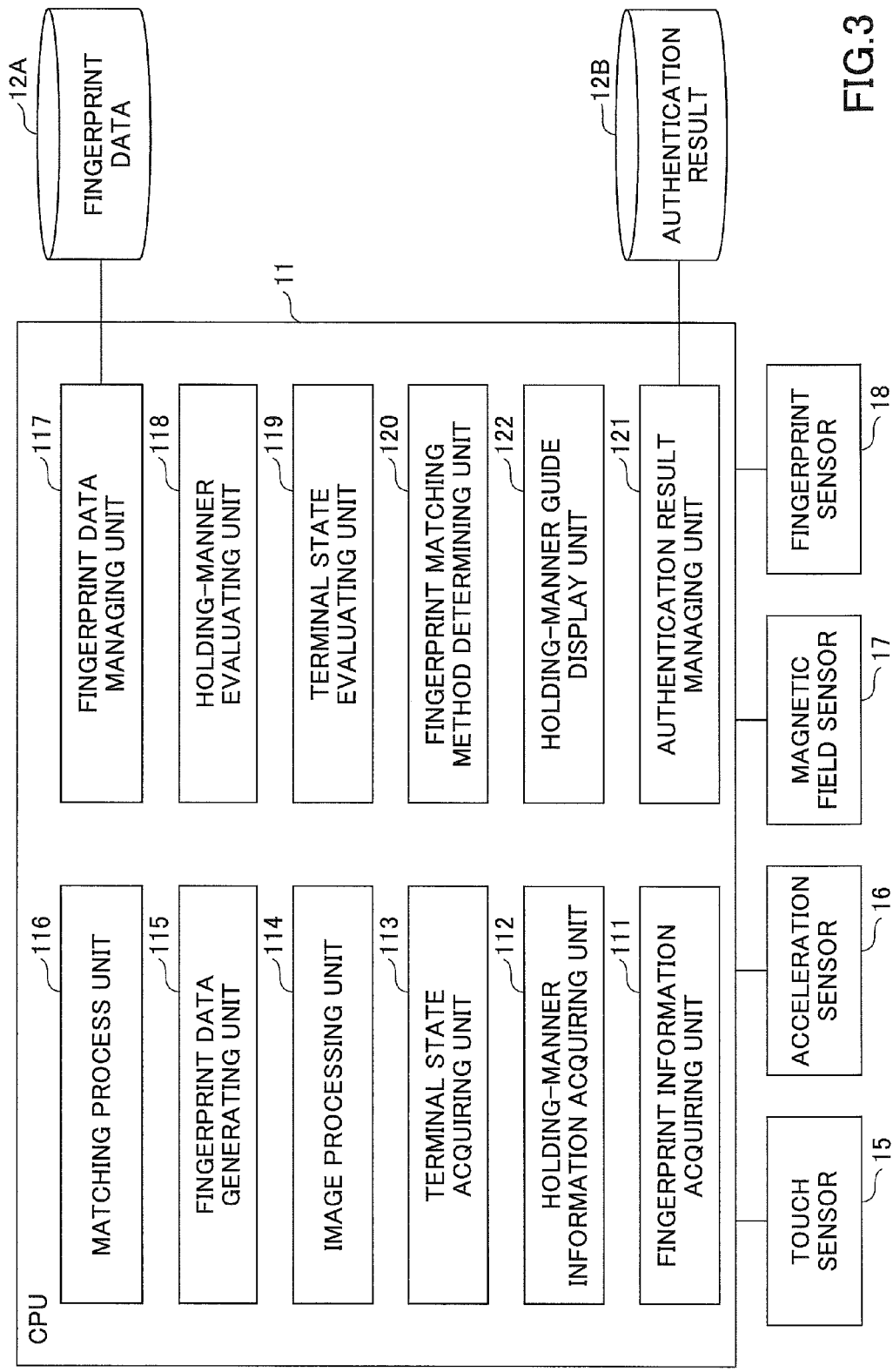

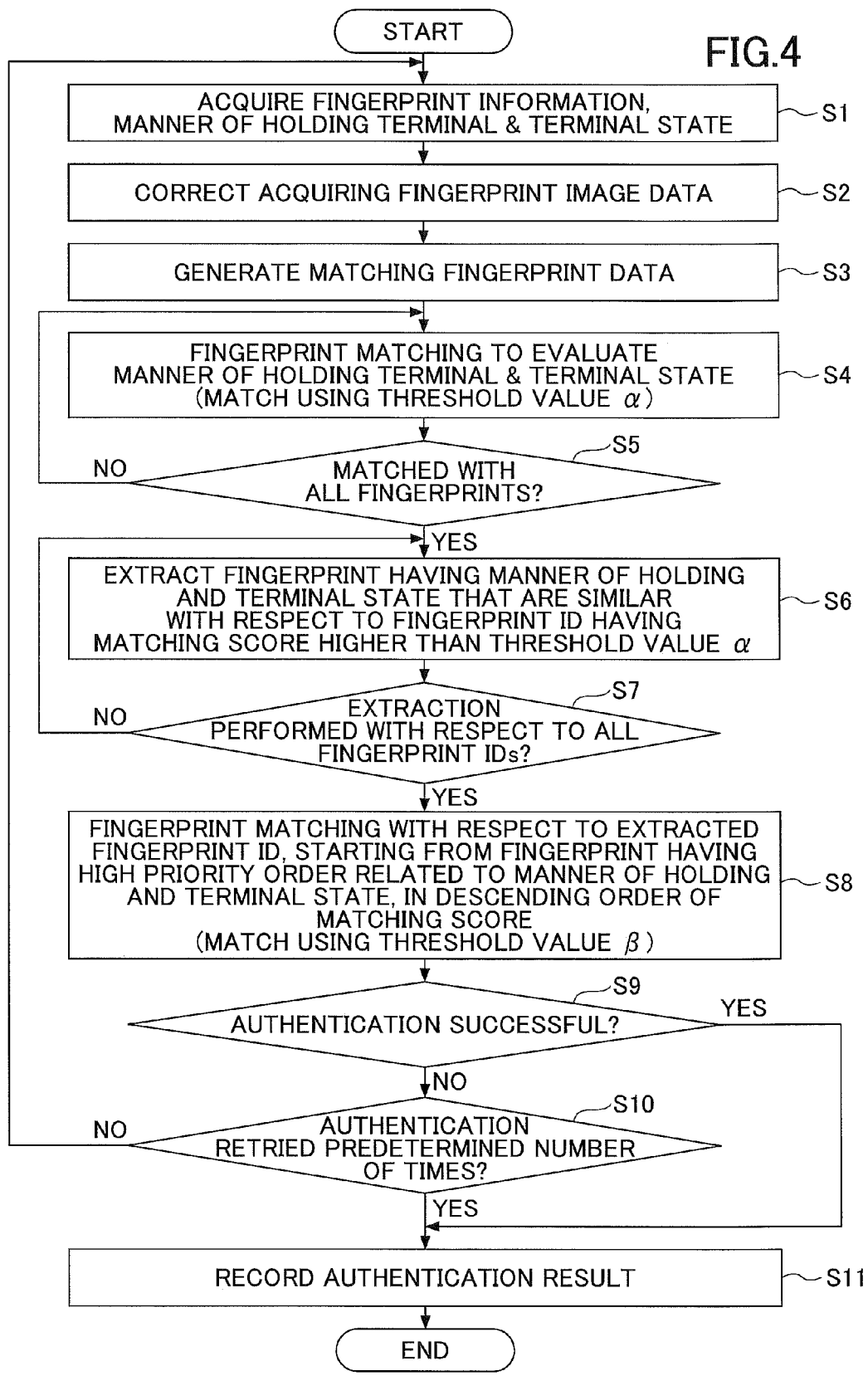

FIG.8

| TIMESTAMP | FINGERPRINT ID | CONTACT POSITION | TERMINAL STATE | MATCHING SCORE | AUTHENTICATION RESULT |
|---|---|---|---|---|---|
| 2014. 06. 15. 08. 10. 50 | 0001 | (10,20), (20,40) | (+30,-10,-20) | 70 | SUCCESSFUL AUTHENTICATION |
| | 0002 | (8,15), (15,35) | (+30,-10,-20) | 60 | |
| ⋮ | ⋮ | ⋮ | ⋮ | ⋮ | ⋮ |

| FINGERPRINT ID | FINGERPRINT ID RELATED TO MANNER OF HOLDING AND TERMINAL STATE | MATCHING SCORE |
|---|---|---|
| 0001 | 0001_0001 | 70 |
| ⋮ | ⋮ | ⋮ |

FIG.11

| TIMESTAMP | FINGERPRINT ID | CONTACT POSITION | TERMINAL STATE | MATCHING SCORE | AUTHENTICATION RESULT |
|---|---|---|---|---|---|
| 2014.06.15.08.10.50 | 0001_0001 | (10,20), (20,40) | (+30,−10,20) | 70 | SUCCESSFUL AUTHENTICATION |
| | 0001_0002 | (10,20), (20,40) | (+30,−10,20) | 60 | SUCCESSFUL AUTHENTICATION |
| ... | ... | ... | ... | ... | ... |

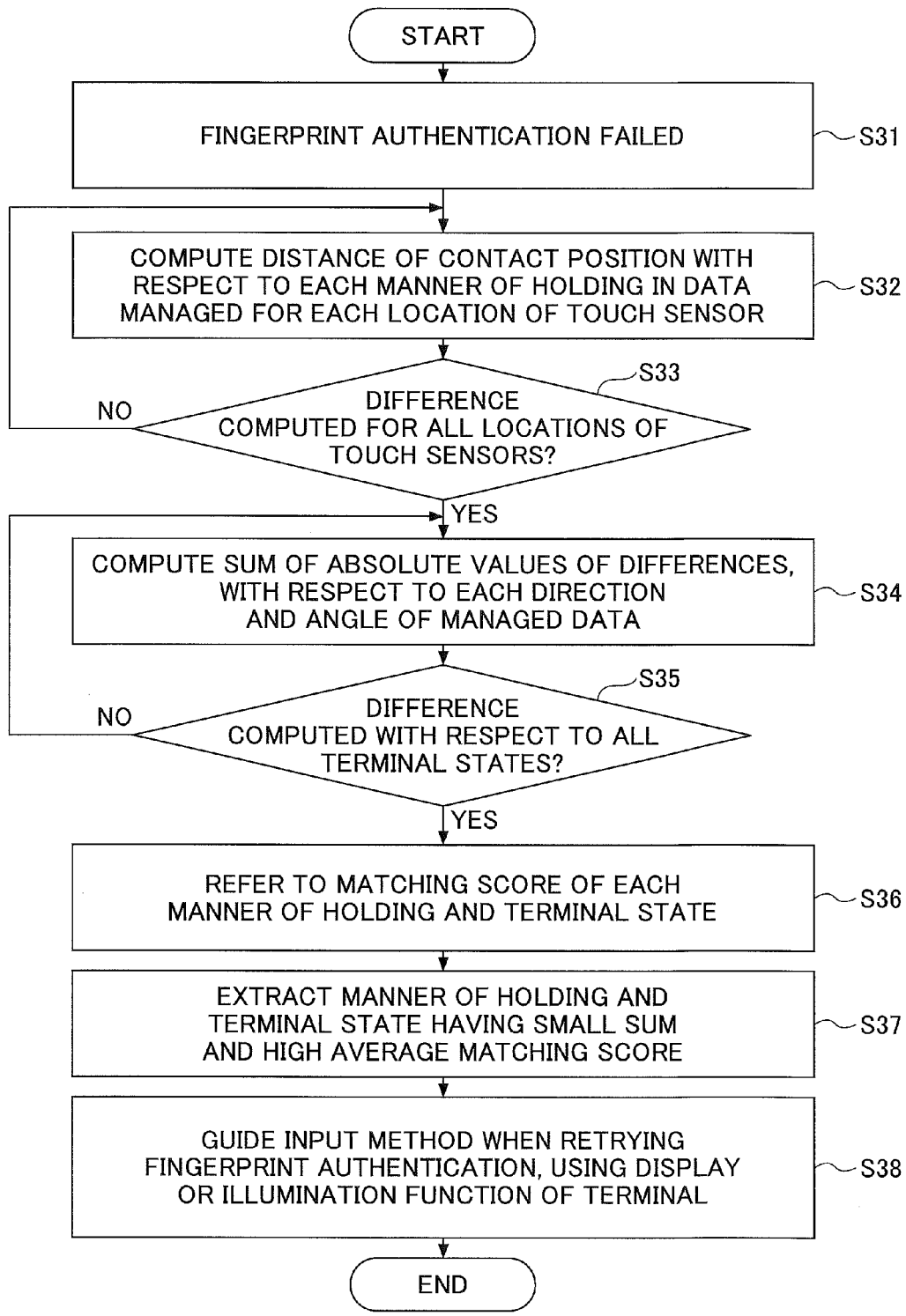

BIOMETRIC AUTHENTICATION APPARATUS AND BIOMETRIC AUTHENTICATION METHOD

CROSS-REFERENCE TO RELATED APPLICATIONS

This application is based upon and claims the benefit of priority of the prior Japanese Patent Application No. 2014-208089, filed on Oct. 9, 2014, the entire contents of which are incorporated herein by reference.

FIELD

The embodiments discussed herein are related to a biometric authentication apparatus, a biometric authentication method, and a computer-readable storage medium having stored therein a biometric authentication program.

BACKGROUND

Fingerprint authentication is used for identity verification or the like when making a log-in to a PC (Personal Computer), entering a room, or the like, for example. Recently, the fingerprint authentication is also used when unlocking a mobile terminal such as a smartphone, a tablet terminal, or the like, for example.

A fingerprint sensor that is used for the fingerprint authentication when making the log-in to the PC may be built into the PC, or connected to the PC via an external USB (Universal Serial Bus) cable. In either case, it is rare for a position of the fingerprint sensor to greatly change every time the fingerprint authentication is performed. In addition, in a case in which the fingerprint authentication is used for the identity verification when entering the room, the fingerprint sensor is fixed to a wall or the like at an entrance of the room, and it is rare for the position of the fingerprint sensor to greatly change every time the fingerprint authentication is performed.

On the other hand, in a case in which the fingerprint authentication is performed on the mobile terminal having the built-in fingerprint sensor, a fingerprint data that is input may vary every time the fingerprint authentication is performed depending to a manner of holding the mobile terminal by the user, and the fingerprint authentication may fail.

A method of stabilizing a fingerprint matching result in a case in which a manner of inputting the fingerprint data (for example, acceleration, pressure, or the like of a user's finger with respect to the fingerprint sensor) differs, includes a proposed technique that adjusts a sensitivity of the fingerprint sensor according to the manner of inputting the fingerprint data. However, in the mobile terminal, the manner of holding the mobile terminal varies when the user performs the fingerprint authentication, and it is difficult to reduce the failure of the fingerprint authentication by merely adjusting the sensitivity of the fingerprint sensor according to the manner of inputting the fingerprint data.

In addition, in biometric authentications other than the fingerprint authentication using the mobile terminal, it is difficult to reduce the failure of the biometric authentication due to reasons similar to those described above for the fingerprint authentication. The biometric authentications other than the fingerprint authentication include authenticating biometric data such as a vein pattern of a palm, a vein pattern of a finger, a palm-print pattern, an iris pattern of an eye, or the like, for example. These biometric data may be input using a sensor, a camera, or the like.

Related art include methods and apparatuses proposed in Japanese Laid-Open Patent Publications No. 2013-239139, No. 2006-011591, and No. 2007-249797, for example.

When performing the biometric authentication by the mobile terminal, it is thus difficult to reduce the failure of the biometric authentication, because the manner of holding the mobile terminal by the user varies in addition to the manner of inputting the biometric data, every time the biometric authentication is performed.

SUMMARY

Accordingly, it is an object in one aspect of the embodiments to provide a biometric authentication apparatus, a biometric authentication method, and a computer-readable storage medium, which can reduce the failure of the biometric authentication.

According to one aspect of the embodiments, a biometric authentication apparatus to perform a biometric authentication in a terminal, including a storage device configured to store a program, and registered data including registered biometric data related to manners of holding the terminal and postures of the terminal; and a processor configured to execute the program stored in the storage device and perform a process including acquiring matching data detected at a time of a biometric authentication and including a matching biometric data, a manner of holding the terminal, and a posture of the terminal, and performing a matching process by comparing the matching data and the registered data registered in the storage device, to extract the registered data including the manner of holding the terminal and the posture of the terminal that are similar to the manner of holding the terminal and the posture of the terminal included in the matching data, and judge a successful biometric authentication when a similarity of the registered biometric data included in the extracted registered data with respect to the matching biometric data is greater than or equal to a first threshold value.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a block diagram for explaining functions of the mobile terminal;

FIG. 4 is a flow chart for explaining an example of a fingerprint matching process;

FIG. 8 is a diagram illustrating an example of authentication results;

FIG. 11 is a diagram for explaining another example of the authentication results;

FIG. 13 is a flow chart for explaining an example of an input guiding process.

DESCRIPTION OF EMBODIMENTS

According to one aspect of the embodiments, a matching data is acquired when performing a biometric authentication in a terminal. The matching data includes a matching biometric data, a manner of holding the terminal, and a posture (or attitude) of the terminal that are detected at a time of the biometric authentication. In addition, the matching data is compared with registered data, in order to extract the registered data including the manner of holding the terminal and the posture of the terminal that are similar to the manner of holding the terminal and the posture of the terminal included in the matching data. The registered data are registered in a storage device, and include registered biometric data related to the manner of holding the terminal and the posture of the terminal. When the registered biometric data included in the extracted registered data has a similarity greater than or equal to a threshold value with respect to the matching biometric data, it is judged that a successful biometric authentication is performed.

Preferred embodiments of the present invention will be described with reference to the accompanying drawings.

A description will now be given of a biometric authentication apparatus, a biometric authentication method, and a computer-readable storage medium in each embodiment according to the present invention.

Figure 1:
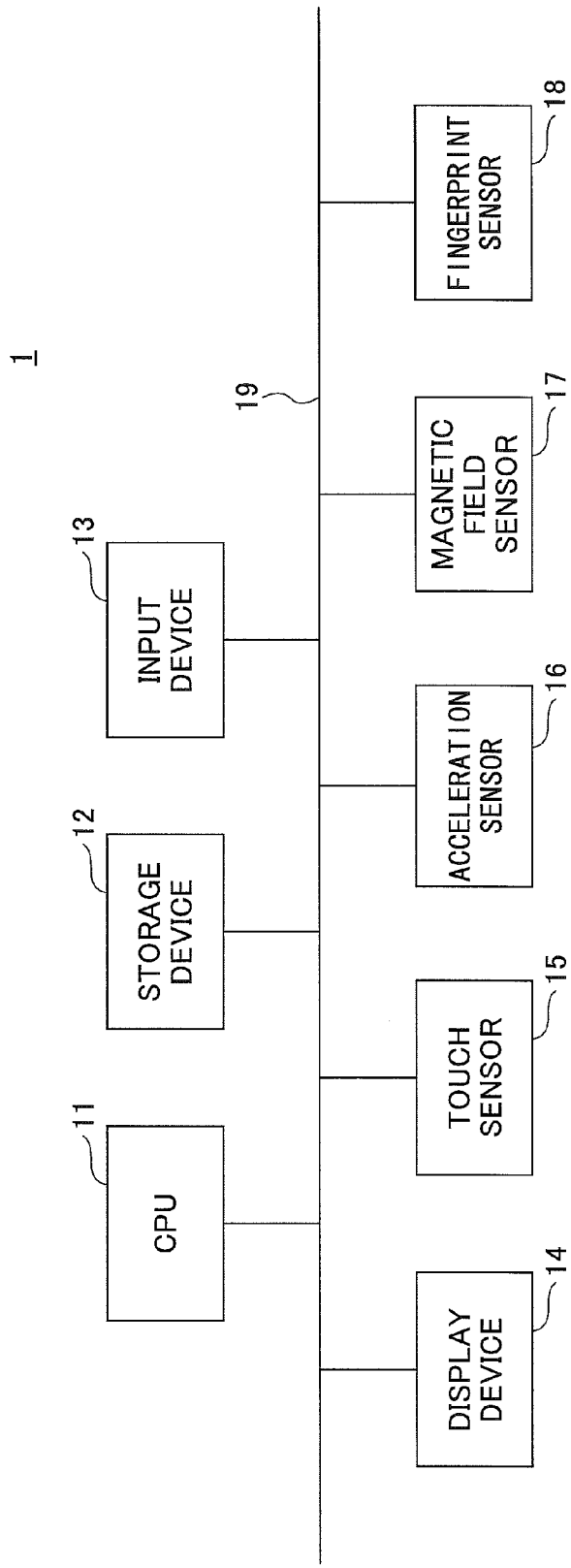
FIG. 1 is a block diagram illustrating an example of a mobile terminal in one embodiment.

FIG. 1 is a block diagram illustrating an example of a mobile terminal in one embodiment. A mobile terminal 1 illustrated in FIG. 1 may be formed by a smartphone, a tablet terminal, or the like, for example, and may be used in each of the embodiments described hereinafter. The mobile terminal 1 may include a CPU (Central Processing Unit) 11, a storage device 12, an input device 13, a display device 14, a touch sensor 15, an acceleration sensor 16, a magnetic field sensor 17, and a fingerprint sensor 18 that are connected via a bus 19. Of course, the mobile terminal 1 is not limited to a configuration in which constituent elements thereof are connected via the bus 19. In addition, in a case in which the mobile terminal 1 has a communication function, the CPU 11 may perform transmission and reception processes, or a transmitter receiver (not illustrated) may be additionally provided to perform the transmission and reception processes. Signals may be transmitted and received via an antenna (not illustrated) according to a known communication method. Further, the mobile terminal 1 may include one or a plurality of cameras (not illustrated) connected to the bus 19.

The CPU 11 is an example of a processor that controls the entire mobile terminal 1. The storage device 123 stores one or more programs executed by the CPU 11, and various kinds of data including threshold values $\alpha$ and $\beta$, registered fingerprint data, a log of authentication results, intermediate results of computations or operations performed by the CPU 11, or the like. The storage device 12 may be formed by computer-readable storage medium including a semiconductor memory device, a disk drive, a combination of the semiconductor memory device and the disk drive, or the like, for example. The computer-readable storage medium that stores one or more programs, including a biometric authentication program, may be a non-transitory computer-readable storage medium. The input device 13 may be formed by a keyboard, or the like that receive inputs to the mobile terminal 1. The display device 14 may be formed by an LCD (Liquid Crystal Display) or the like, for example, and may display messages for a user, operation menus of the mobile terminal 1, information related to processes performed by the mobile terminal 1, or the like. The input device 13 and the display device 14 may be integrally formed by a touchscreen panel, or the like, for example.

The touch sensor 15 may be formed by a pressure sensor, or the like, for example. The touch sensor 15 is an example of a sensor that detects a position where the user makes contact with the mobile terminal 1, and outputs a holding-manner data. In a case in which the user holds the mobile terminal 1, the touch sensor 15 detects positions (for example, two to four positions) where a user's hand (for example, one or more fingers, or a part of a palm) makes contact with the mobile terminal 1. The acceleration sensor 16 detects an acceleration of the mobile terminal 1, and is an example of a sensor that detects a direction (or orientation) of the mobile terminal 1 and outputs a direction data (or orientation data). The magnetic field sensor 17 detects a magnetic field at the position of the mobile terminal 1, and is an example of a sensor that detects an angle of the mobile terminal 1 and outputs an angular data. The acceleration sensor 16 and the magnetic field sensor 17 may form an example of a sensor that detects a state of the mobile terminal 1 and outputs a state data. The fingerprint sensor 18 detects a fingerprint of the user by a known method, and outputs a fingerprint image. The fingerprint sensor 18 is an example of a biometric sensor that detects and outputs a biometric image. Each of the sensors 15 through 18 described above may be formed by a known sensor.

Figure 2A:
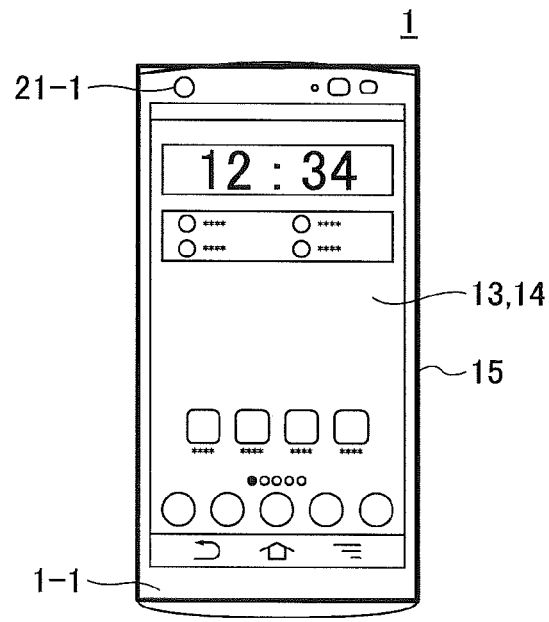
FIG. 2A is a top view of the mobile terminal.
Figure 2B:
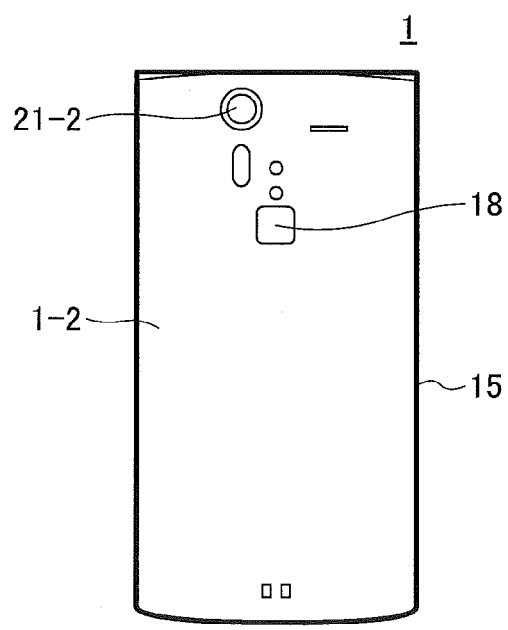
FIG. 2B is a bottom view of the mobile terminal.

FIG. 2A is a top view of the mobile terminal, and FIG. 2B is a bottom view of the mobile terminal. In this example, the mobile terminal 1 is formed by a smartphone. As illustrated in FIG. 2A, a touchscreen panel forming the input device 13 and the display device 14, and a camera 21-1 are provided on a top surface 1-1 of the mobile terminal 1. In FIG. 2A, the touchscreen panel displays the time, buttons (or icons) for selecting applications, or the like, however, information displayed on the touchscreen panel is not limited to such information.

In addition, as illustrated in FIG. 2B, the fingerprint sensor 18 and a camera 21-2 are provided on a bottom surface 1-2 of the mobile terminal 1. The camera 21-1 or the camera 21-2 may form a biometric sensor that detects the biometric image, such as the fingerprint pattern, the vein pattern of the palm, the vein pattern of the finger, the palm-print pattern, the iris pattern of the eye, or the like. Of course, when using the camera 21-1 or the camera 21-2 to detect the fingerprint image, the fingerprint sensor 18 illustrated in FIGS. 1 and 2B may be omitted. Furthermore, positions where the fingerprint sensor 18 and the cameras 21-1 and 21-2 are provided are not limited to the positions of the mobile terminal 1 illustrated in FIGS. 2A and 2B.

The touch sensor 15 is provided along an outer peripheral part on a side surface of the mobile terminal 1. In this example, the touch sensor 15 is provided along each side of the mobile terminal 1 having a rectangular shape on the top view illustrated in FIG. 2A. When the user holds the mobile terminal 1, the touch sensor 15 detects the position at each side of the rectangular shape where the user's finger (or a part of the palm) makes contact with the mobile terminal 1.

FIG. 3 is a block diagram for explaining functions of the mobile terminal. For the sake of convenience, FIG. 3 illustrates functional blocks of the CPU 11, together with the sensors 15 through 18. The functional blocks of the CPU 11 include a fingerprint information acquiring unit 111, a holding-manner information acquiring unit 112, a terminal state acquiring unit 113, an image processing unit 114, a fingerprint data generating unit 115, a matching process unit 116, a fingerprint data managing unit 117, a holding-manner evaluating unit 118, a terminal state evaluating unit 119, a fingerprint matching method determining unit 120, an authentication result managing unit 121, and a holding-manner guide display unit 122. Functions of these units 111 through 122 may be performed by the CPU 11, for example, when the CPU 11 executes the biometric authentication program stored in the storage device 12. Each of the units 111 through 122 may form a fingerprint authentication apparatus that is an example of the biometric authentication apparatus. The fingerprint authentication apparatus may include the sensors 15 through 18.

The fingerprint information acquiring unit 111 acquires the fingerprint image, that is an example of fingerprint information, detected by the fingerprint sensor 18. The holding-manner information acquiring unit 112 acquires holding-manner information from contact positions of the user's hand with respect to the mobile terminal 1 detected by the touch sensor 15. The terminal state acquiring unit 113 acquires a state of the mobile terminal 1, that is, a state (hereinafter also referred to as "terminal state"), from the direction of the mobile terminal 1 detected by the acceleration sensor 16 and the angle of the mobile terminal 1 detected by the magnetic field sensor 17. The image processing unit 114 performs an image processing, such as noise elimination, binarization (or digitization), thinning, or the like, for example, with respect to the fingerprint image acquired by the fingerprint information acquiring unit 111. The fingerprint data generating unit 115 generates a matching fingerprint data (or authenticating fingerprint data) to be used for the fingerprint authentication, from the fingerprint image that is subjected to the image processing by the image processing unit 114. The fingerprint data is an example of the biometric data.

The fingerprint information acquiring unit 111, the holding-manner information acquiring unit 112, the terminal state acquiring unit 113, the image processing unit 114, and the fingerprint data generating unit 115 may form an example of an acquiring unit that acquires matching data including the matching biometric data, the manner of holding the mobile terminal 1 (or holding-manner information), and the posture of the mobile terminal 1 (or posture information) that are detected at the time of the biometric authentication.

The matching process unit 116 matches the matching fingerprint data generated by the fingerprint data generating unit 115 with a plurality of registered fingerprint data stored within a storage device 12A, in order to verify the identity of the user at the time of the fingerprint authentication. The matching process unit 116 may form an example of a matching process unit to compare the matching data acquired by the acquiring unit described above with the registered data registered within the storage device 12A and including the registered biometric data related to the manner of holding and the posture of the mobile terminal 1, and extract the registered data including the manner of holding and the posture of the mobile terminal 1 similar to the manner of holding and the posture of the mobile terminal 1 included in the matching data. The matching process unit 116 may form this example of the matching process unit to judge that the biometric authentication is successful in a case in which a similarity of the registered biometric data included in the extracted registered data with respect to the matching biometric data included in the matching data is greater than or equal to the threshold value $\beta$ which will be described later. The matching process unit 116 may form an example of a matching process unit to extract the registered data including the registered biometric data having the similarity greater than or equal to the threshold value $\alpha$ ($<\beta$) which will be described later with respect to the matching biometric data of the matching data, in order to compare the manner of holding and the posture included in the registered data with the manner of holding and the posture included in the matching data.

The fingerprint data managing unit 117 may newly register the registered fingerprint data within the storage device 12A, and update or delete the registered fingerprint data stored within the storage device 12A. The storage device 12A may be formed by a part of the storage device 12 illustrated in FIG. 1, for example. The registered fingerprint data that is registered in the storage device 12A by the fingerprint data managing unit 117 may be acquired in a manner similar to that at the time of the fingerprint authentication, for example, by acquiring the fingerprint image detected by the fingerprint sensor 18 at the time of newly registering or updating the fingerprint data, through the fingerprint information acquiring unit 111, the image processing unit 114, and the fingerprint data generating unit 115.

The holding-manner evaluating unit 118 evaluates the manner of holding at the time of the fingerprint authentication, by comparing the holding-manner information acquired by the holding-manner information acquiring unit 112 at the time of the fingerprint authentication with the holding-manner information related to the registered fingerprint data stored within the storage device 12A. The terminal state evaluating unit 119 evaluates the terminal state at the time of the fingerprint authentication, by comparing the terminal state at the time of the fingerprint authentication acquired by the terminal state acquiring unit 113 with the terminal state related to the registered fingerprint data stored within the storage device 12A. The fingerprint matching method determining unit 120 refers to the manner of holding at the time of the fingerprint authentication evaluated by the holding-manner evaluating unit 118 and a priority order of the registered fingerprint data related to the terminal state at the time of the fingerprint authentication evaluated by the terminal state evaluating unit 119, and determines extraction of the registered fingerprint data that are matching targets, and determines a matching order of the extracted registered fingerprint data.

The authentication result managing unit 121 accumulates and manages the authentication results, such as a matching score, the manner of holding the mobile terminal 1, the terminal state, or the like, in a storage device 12B, in a manner related to the registered fingerprint data referred to by the matching process unit 116 when matching the matching fingerprint data. The storage device 12B may be formed by a part of the storage device 12 illustrated in FIG. 1, for example. The fingerprint matching method determining unit 120 determines a matching procedure to match the matching fingerprint data with the plurality of registered fingerprint data according to the manner of holding and the terminal state of the mobile terminal 1 at the time of the fingerprint authentication, based on the authentication results accumulated by the authentication result managing unit 121.

The holding-manner guide display unit 122 notifies the manner of holding or the contact positions of the mobile terminal 1 when the fingerprint authentication fails, and guides the user to employ an appropriate manner of holding or fingerprint input method. The holding-manner guide display unit 122 displays the manner of holding or the contact positions of the mobile terminal 1 on the display device 14, for example, to provide the user with the appropriate manner of holding or fingerprint input method. The holding-manner guide display unit 122 may form an example of a guide display unit that guides the user to employ the manner or holding or the biometric input method for reducing failure of the biometric authentication, when the matching process unit 116 judges the failure of the biometric authentication.

(First Embodiment)

In a first embodiment, a plurality of registered fingerprint data are registered in a manner related to the manner of holding and the terminal state of the mobile terminal 1 and registered. In addition, a relation of the registered fingerprint data used for the authentication, the matching score, and the manner of holding and the terminal state are periodically evaluated using the log of the accumulated authentication results, in order to determine the matching procedure to match the matching fingerprint data with the plurality of registered fingerprint data. At the time of the fingerprint authentication, the matching of the matching fingerprint data with respect to the plurality of registered fingerprint data is performed according to the matching procedure that is determined in advance, according to the manner of holding the mobile terminal 1, in order to verify the identity of the user. In this first embodiment, the holding-manner guide display unit 122 illustrated in FIG. 3 may be omitted.

Figure 5A:
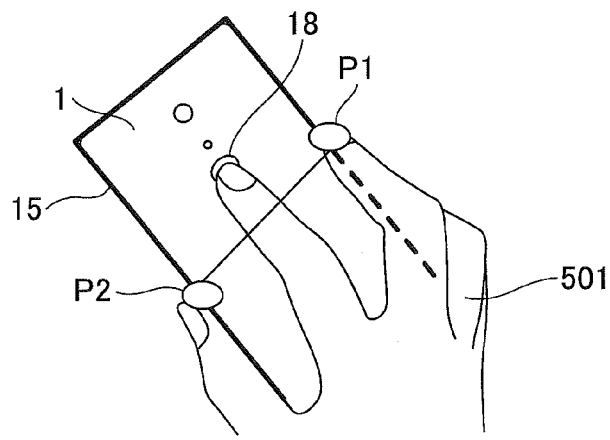
FIG. 5A is a diagram for explaining an example of a manner of holding the mobile terminal.
Figure 5B:
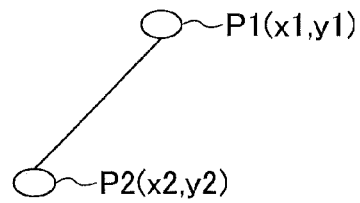
FIG. 5B is a diagram for explaining an example of contact positions with respect to the mobile terminal.
Figure 6:
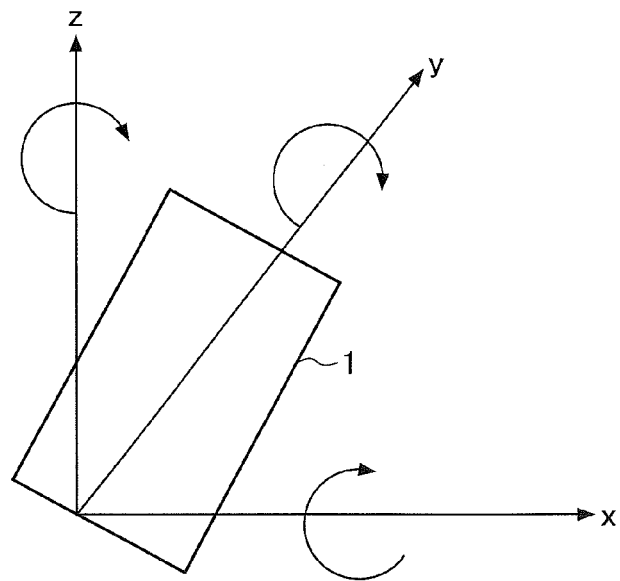
FIG. 6 is a diagram for explaining acquisition of a state of the mobile terminal.

FIG. 4 is a flow chart for explaining an example of a fingerprint matching process. In step S1 illustrated in FIG. 4, when the user holds the mobile terminal 1 by the user's hand 501 as illustrated in FIG. 5A and inputs the fingerprint image from the fingerprint sensor 18, the fingerprint information acquiring unit 111 acquires the fingerprint image from the fingerprint sensor 18, and the holding-manner information acquiring unit 112 acquires the contact position information of the mobile terminal 1 from the touch sensor 15. In addition, the terminal state acquiring unit 113 acquires rotating directions (in positive or negative direction) of the mobile terminal 1 illustrated in FIG. 6 around an x-axis, a y-axis, and a z-axis (that is, each of the x, y, and z axis of a polar coordinate system) that are used as centers of rotation from the acceleration sensor 16, and acquires rotating angles of the mobile terminal 1 around the x-axis, the y-axis, and the z-axis that are used as the centers of rotation from the magnetic field sensor 17. FIG. 5A is a diagram for explaining an example of a manner of holding the mobile terminal 1. FIG. 5B is a diagram for explaining an example of contact positions with respect to the manner of holding the mobile terminal 1 illustrated in FIG. 5A. In a case in which the user holds the mobile terminal 1 by the user's hand 501 at contact positions P1 and P2 illustrated in FIG. 5A, the contact position information output from the touch sensor 15 includes coordinate values (x1, y1) of the contact position P1 and coordinate values (x2, y2) of the contact position P2. FIG. 6 is a diagram for explaining acquisition of a state of the mobile terminal 1.

Next, in step S2, the image processing unit 114 performs a correction process on the fingerprint image acquired by the fingerprint information acquiring unit 111 from the fingerprint sensor 18. In step S3, the fingerprint data generating unit 115 generates the matching fingerprint data from the fingerprint image that is subjected to the image processing including the correction process by the image processing unit 114.

Next, in step S4, the matching process unit 116 performs a fingerprint matching for evaluating the manner of holding and the terminal state of the mobile terminal 1. The threshold value $\alpha$ used for this fingerprint matching is set to a value smaller (or lower) than that of the threshold value $\beta$ that is used at the time of a fingerprint matching for verifying the identity of the user in step S8 which will be described later. The threshold value $\alpha$ is set smaller than the threshold value $\beta$, for the purposes of extracting from the plurality of registered fingerprint data a fingerprint data that is registered under conditions similar to the manner of holding and the terminal state of the mobile terminal 1 at the time of the fingerprint authentication. In step S5, the matching process unit 116 judges whether the matching of the matching fingerprint data with respect to all of the registered fingerprint data ended. The process returns to step S4 when the judgment result in step S5 is NO, and the process advances to step S6 when the judgment result in step S5 is YES.

Figure 7:
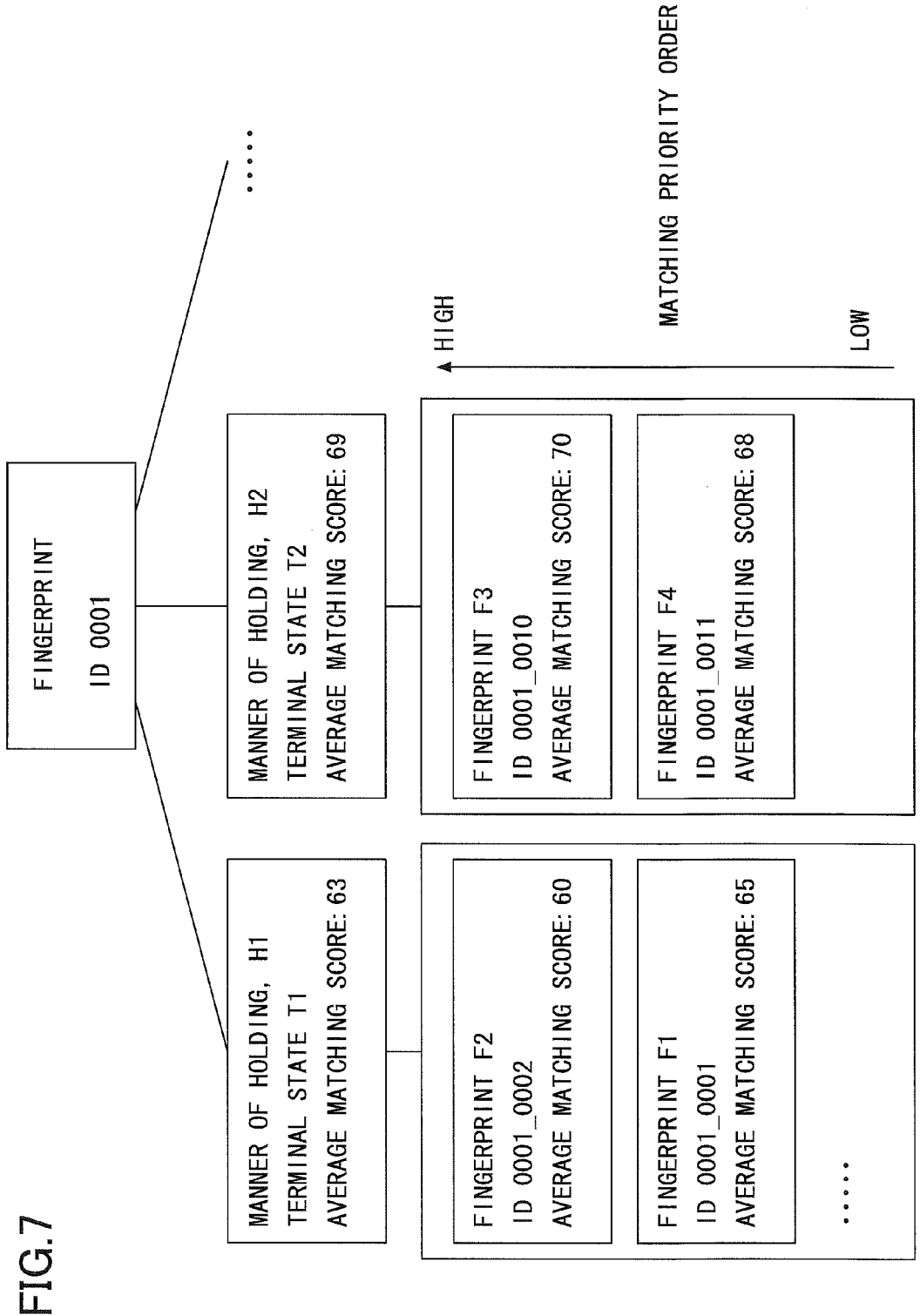
FIG. 7 is a diagram for explaining an example of a fingerprint data management method.

In step S6, as a result of matching the matching fingerprint data with respect to all of the registered fingerprint data, the matching process unit 116 extracts the registered fingerprint data having the manner of holding and the terminal state that are similar, with respect to a fingerprint ID having the matching score larger (or higher) than the threshold value $\alpha$ in FIG. 7. The matching score is an example of information indicating a similarity of the registered fingerprint data to the matching fingerprint data. In this example, the higher the similarity, the larger the matching score, and a maximum value of the matching score is 100 points to indicate a perfect match. FIG. 7 is a diagram for explaining an example of a fingerprint data management method. In the example illustrated in FIG. 7, with respect to the fingerprint data having a fingerprint ID 0001, a fingerprint F2 having a fingerprint ID 0001_0002 and an average matching score of 60 points, a fingerprint F1 having a fingerprint ID 0001_0001 and an average matching score of 65 points, or the like are included in a fingerprint having an average matching score of 63 points for a case in which the manner of holding and the terminal state are similar to H1 and T1, respectively. In addition, a fingerprint F3 having a fingerprint ID 0001_0010 and an average matching score of 70 points, a fingerprint F4 having a fingerprint ID 0001_0011 and an average matching score of 68 points, or the like are included in a fingerprint having an average matching score of 69 points for a case in which the manner of holding and the terminal state are similar to H2 and T2, respectively.

In step S7, the matching process unit 116 judges whether the extraction of the fingerprint data having the manner of holding and the terminal state that are similar are extracted with respect to all of the fingerprint IDs. The process returns to step S6 when the judgment result in step S7 is NO, and the process advances to step S8 when the judgment result in step S7 is YES. In step S8, the matching process unit 116 performs a fingerprint matching using the threshold value $\beta$ starting from the fingerprint having a high priority order related to the manner of holding and the terminal state illustrated in FIG. 7, in a descending order of the matching score with respect to the registered fingerprint data of all of the fingerprint IDs that are extracted, in order to verify the identity of the user. When the registered fingerprint data that are extracted include the registered fingerprint data having the manner of holding and the terminal state similar to those of the matching fingerprint data and having the matching score higher than the threshold value β, it is judged that the fingerprint authentication is successful and that the identity of the user is verified. In step S9, the matching process unit 116 judges whether the fingerprint authentication is successful and the identity of the user is verified. The process advances to step S10 when the judgment result in step S9 is NO, and the process advances to step S11 when the judgment result in step S9 is YES.

The priority order illustrated in FIG. 7 may be determined by periodically referring to the authentication results, and using statistical information of the matching scores (for example, an average value of the matching scores). Hence, it is possible to perform the fingerprint matching of the matching fingerprint data with a priority starting from an optimum registered fingerprint data having the high matching score, by taking into consideration the manner of holding and the terminal state of the mobile terminal 1. In order to determine the priority order of the registered fingerprints to be matched with the input matching fingerprint by taking into consideration the manner of holding and the terminal state of the mobile terminal 1, the registered fingerprints having the manner of holding and the terminal state that are similar to those with respect to the registered fingerprint having the fingerprint ID 0001 are extracted, and the fingerprint matching is performed according to the priority order of the registered fingerprint related to the manner of holding and the terminal state, as illustrated in FIG. 7. The registered fingerprint having the fingerprint ID 0001 and selected as the matching target is the fingerprint having the fingerprint ID 0001 xxxx and the highest matching score in FIG. 7, such as the fingerprint F2, the fingerprint F3, or the like in the example illustrated in FIG. 7. The registered fingerprint related to the manner of holding and the terminal state illustrated under the fingerprint having the highest matching score in FIG. 7 is the same as the fingerprint having the fingerprint ID 0001, however, the matching score thereof is lower than that of the fingerprint having the fingerprint ID 0001 xxxx.

In step S10, the matching process unit 116 judges whether a retry of the authentication process described above is performed a predetermined number of times. The process returns to step S1 when the judgment result in step S10 is NO, and the process advances to step S11 when the judgment result in step S10 is YES. In step S11, the authentication result managing unit 121 records the authentication result in the log within the storage device 12B, and the process ends. FIG. 8 is a diagram illustrating an example of the authentication results recorded in the log. The log illustrated in FIG. 8 includes a timestamp, the fingerprint ID, the coordinate values of the contact positions indicating the manner of holding the mobile terminal 1, the rotating directions and the rotating angles of the mobile terminal 1 around the x-axis, the y-axis, and the z-axis that are used as centers of rotation indicating the terminal state, the matching score, and the authentication result. The authentication result may indicate a successful authentication or a failed authentication. With respect to each fingerprint ID, such as the fingerprint ID 0001, for example, the fingerprint ID 0001_xxxx (for example, 0001_0001) related to the manner of holding and the terminal state of the mobile terminal 1, and the matching score are included in the log, as indicated in a lower part of FIG. 8.

As described above, this embodiment performs a preprocessing in which the fingerprint data managing unit 117, at the time of the fingerprint registration, manages the registered fingerprints within the storage device 12A by grouping the registered fingerprints having the manner of holding and the terminal state of the mobile terminal 1 that are similar, as illustrated in FIG. 7. In addition, the authentication result managing unit 121, at the time of the fingerprint authentication, stores the authentication results in the log within the storage device 12B, as illustrated in FIG. 8. As described above, this log includes the manner of holding and the terminal state of the mobile terminal 1, the matching score, and the authentication result at the time of the fingerprint authentication. The holding-manner evaluating unit 118 and the terminal state evaluating unit 119 use the log to periodically compute the average value of the matching scores, and update the fingerprint data by setting the priority in the descending order of the average matching score, with respect to the registered fingerprints related to the manner of holding and the terminal state illustrated in FIG. 7. For example, the coordinate values (10, 20) and (20, 40) of the two contact positions P1 and P2 illustrated in FIGS. 5A and 5B are set to the manner of holding, H1, in FIG. 7, and the direction and angle (+30, −10, −2) of the mobile terminal 1 at the time of the fingerprint registration are set to the terminal state T1. In addition, the fingerprint F1 (ID 0001_0001) and the fingerprint F2 (ID 0001_0002) are related to the manner of holding, H1, and the terminal state T1, and registered. Further, as illustrated in FIG. 7, the registered fingerprints F1 and F2 are set in the descending order of the priority order in which the matching is performed using the computed average matching scores, with respect to the registered fingerprint having the manner of holding, H1, and the terminal state T1. The registered fingerprints F3 and F4 are similarly set in the descending order of the priority order in which the matching is performed using the computed average matching scores, with respect to the registered fingerprint having the manner of holding, H2, and the terminal state T2.

Next, when the user performs the fingerprint authentication, the fingerprint image is input from the fingerprint sensor 18 as illustrated in FIG. 5A, for example, and the fingerprint information acquiring unit 111 acquires the fingerprint image as an example of the fingerprint information. The holding-manner information acquiring unit 112 acquires the coordinate values (10, 20) and (20, 40) of the two contact positions P1 and P2 illustrated in FIG. 5A, for example, as an example of the holding-manner information. The terminal state acquiring unit 113 acquires the direction and angle (+30, −10, −2) of the mobile terminal 1 from the acceleration sensor 16 and the magnetic field sensor 17, as an example of the terminal state. Then, the fingerprint matching method determining unit 120 matches the matching fingerprint with the fingerprints having the fingerprint IDs 0001 to 000n (n is a natural number greater than or equal to one) illustrated in FIG. 7 using the threshold value α (for example, the matching score of 50 points or higher), in order to extract the fingerprints related to the manner of holding and the terminal state that are used for the identity verification. In this example, only the fingerprints having the fingerprint ID 0001 is extracted as having the matching score greater than or equal to the threshold value α (for example, the matching score of 50 points). Next, the holding-manner evaluating unit 118 and the terminal state evaluating unit 119 compare the coordinate values (10, 20) and (20, 40) of the two contact positions P1 and P2 of the mobile terminal and the direction and angle (+30, −10, −2) of the mobile terminal 1 at the time of the fingerprint authentication with the manner of holding and the terminal state of the mobile terminal 1 related to the registered fingerprint ID 0001, respectively, and extract the manner of holding, H1, and the terminal state T1. Thereafter, the fingerprint matching method determining method 120 refers to the priority order of the registered fingerprints related to the manner of holding, H1, and the terminal state T1, to determine the extraction of the registered fingerprints that are the matching targets and determine the matching order of the extracted registered fingerprints. In this example, it is assumed for the sake of convenience that the manner of holding and the terminal state of the mobile terminal 1 at the time of the fingerprint authentication are similar to the manner of holding, H1, and the terminal state T1 illustrated in FIG. 7. Hence, when a reference is made to the priority order of the registered fingerprints related to the manner of holding, H1, and the terminal state T1, the priority order is in the descending order for the fingerprint F2, the fingerprint F1, or the like. Accordingly, with respect to the matching fingerprint data, the matching is performed in the order of the registered fingerprint F2, the registered fingerprint F1, or the like using the threshold value β (for example, the matching score of 60 point or higher verifies the identity of the user), in order to verify the identity of the user and record the log of the authentication result.

According to this embodiment, when verifying the identity of the user using the fingerprint authentication of the mobile terminal 1, the registered fingerprints to be used for the fingerprint authentication are selected according to the manner of holding and the terminal state of the mobile terminal 1. For this reason, the registered fingerprints for which the manner of holding and the terminal state of the mobile terminal 1 at the time of the fingerprint registration greatly differ from those at the time of the fingerprint authentication can be excluded from the matching targets. Consequently, it is possible to suppress a deviation in the matching fingerprint from the registered fingerprint due to changes in the manner of holding and the terminal state of the mobile terminal 1 at the time of the fingerprint authentication from those at the time of the fingerprint registration, and reduce the failure of the fingerprint authentication.

(Second Embodiment)

Unlike the first embodiment described above, a second embodiment does not perform the fingerprint matching to extract the registered fingerprint data related to the manner of holding and the terminal state that are similar to the manner of holding and the terminal state of the mobile terminal 1 at the time of the fingerprint authentication. Instead, this second embodiment first evaluates the manner of holding and the terminal state of the mobile terminal 1, to determine the extraction of the registered fingerprints that are the matching targets and determine the matching priority order of the extracted registered fingerprints. Hence, in a case in which the number of users of the mobile terminal 1, the number of registered fingerprints, and the number of patterns of the changes in the manner of holding and the terminal state of the mobile terminal 1 at the time of the fingerprint registration are all small, it is possible to perform the fingerprint matching process at a higher speed compared to the first embodiment described above, by not performing the fingerprint matching for extracting the manner of holding and the terminal state of the mobile terminal 1 at the time of the fingerprint authentication.

On the other hand, in a case in which the number of users of the mobile terminal 1, the number of registered fingerprints, and the number of patterns of the changes in the manner of holding and the terminal state of the mobile terminal 1 at the time of the fingerprint registration are all large, the first embodiment described above can perform the fingerprint matching process at a higher speed compared to the second embodiment, by performing the fingerprint matching for extracting the manner of holding and the terminal state of the mobile terminal 1 at the time of the fingerprint authentication.

Figure 9:
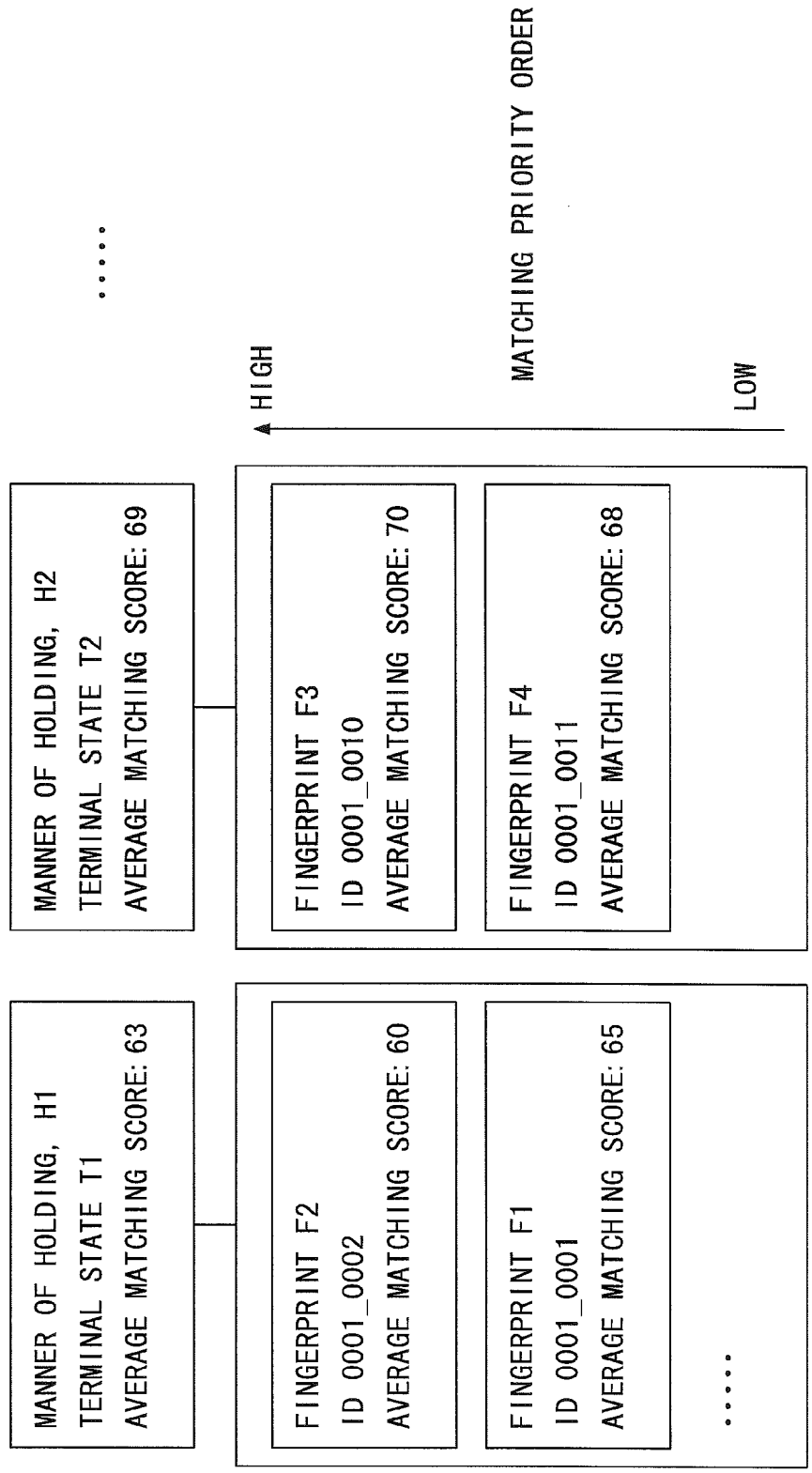
FIG. 9 is a diagram for explaining another example of the fingerprint data management method.

FIG. 9 is a diagram for explaining another example of the fingerprint data management method. In the case of the fingerprint data management method used in the first embodiment and described in conjunction with FIG. 7, when categorizing the same registered fingerprints, the fingerprint having the highest matching score amongst the same fingerprints is used for the fingerprint matching to evaluate the manner of holding and the terminal state of the mobile terminal 1, and is positioned at an apex of the tree in FIG. 7. On the other hand, in the case of the fingerprint data management method used in this second embodiment and described hereunder in conjunction with FIG. 9, the fingerprint matching to evaluate the manner of holding and the terminal state of the mobile terminal 1 is not performed, in order to perform the fingerprint matching process at a high speed. Hence, as illustrated in FIG. 9, the fingerprint data management method used in this second embodiment categorizes the same fingerprints, and simply relates the fingerprint with respect to the manner of holding and the terminal state. In this second embodiment, the holding-manner guide display unit 122 illustrated in FIG. 3 may be omitted.

Figure 10:
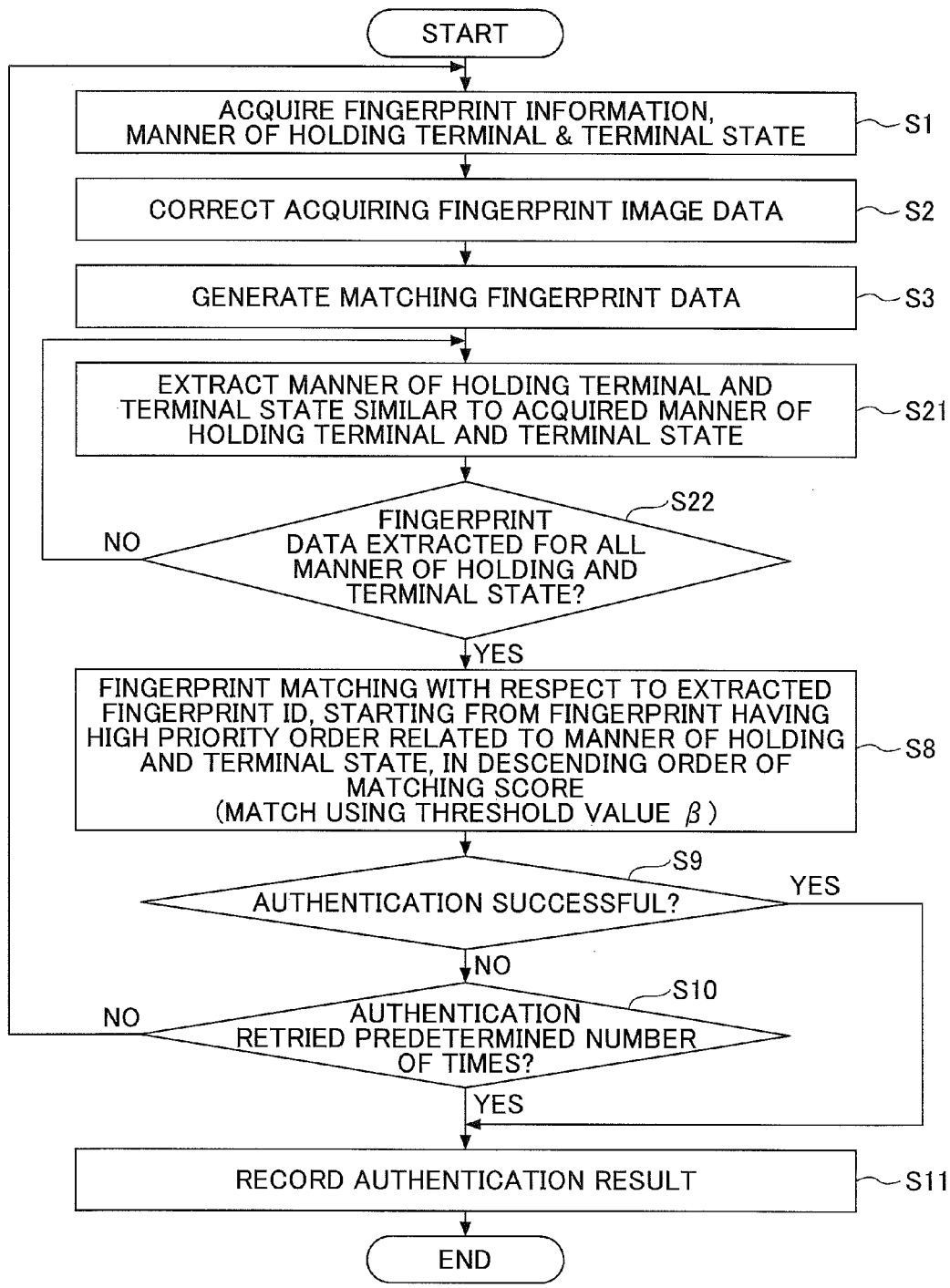
FIG. 10 is a flow chart for explaining another example of the fingerprint matching process.

FIG. 10 is a flow chart for explaining another example of the fingerprint matching process. In FIG. 10, those steps that are the same as those corresponding steps in FIG. 4 are designated by the same reference numerals, and a description thereof will be omitted. Processes of steps S1 through S3, in which the user inputs the fingerprint image from the fingerprint sensor 18 of the mobile terminal 1,yje information of the contact positions and the terminal state of the mobile terminal 1 is acquired, the fingerprint image is correct, and the matching fingerprint data is generated, may be the same as those of the first embodiment described above. Next, in step S21, the matching process unit 116 illustrated in FIG. 3 extracts the fingerprint data having the manner of holding and the terminal state that are similar to the manner of holding and the terminal state of the mobile terminal 1 acquired at the time of the fingerprint authentication, from the fingerprint data managed as illustrated in FIG. 9 by the fingerprint data managing unit 117. In step S22, the matching process unit 116 judges whether the fingerprint data having the similar manner of holding and terminal state is extracted with respect to all manners of holding and all terminal states of the mobile terminal 1. The process returns to step S21 when the judgment result in step S22 is NO, and the process advances to step S8 when the judgment result in step S22 is YES.

In step S8, the matching process unit 116 performs the fingerprint matching using the threshold value β starting from the fingerprint having the high priority order related to the manner of holding and the terminal state illustrated in FIG. 9, in the descending order of the matching score with respect to the registered fingerprint data of all of the fingerprint IDs that are extracted, in order to verify the identity of the user. In the example illustrated in FIG. 9, with respect to the fingerprint data having the fingerprint ID 0001, the fingerprint F2 having the fingerprint ID 0001_0002 and the average matching score of 60 points, the fingerprint F1 having the fingerprint ID 0001_0001 and the average matching score of 65 points, or the like are included in the fingerprint having the average matching score of 63 points for the case in which the manner of holding and the terminal state are similar to H1 and T1, respectively. In addition, the fingerprint F3 having the fingerprint ID 0001_0010 and the average matching score of 70 points, the fingerprint F4 having the fingerprint ID 0001_0011 and the average matching score of 68 points, or the like are included in the fingerprint having the average matching score of 69 points for the case in which the manner of holding and the terminal state are similar to H2 and T2, respectively.

In step S9, the matching process unit 116 judges whether the fingerprint authentication is successful and the identity of the user is verified. The process advances to step S10 when the judgment result in step S9 is NO, and the process advances to step S11 when the judgment result in step S9 is YES. In step S11, the authentication result managing unit 121 records the authentication result in the log within the storage device 12B, and the process ends. FIG. 11 is a diagram illustrating another example of the authentication results recorded in the log. The log illustrated in FIG. 11 includes the timestamp, the fingerprint ID, the coordinate values of the contact positions indicating the manner of holding the mobile terminal 1, the rotating directions and the rotating angles of the mobile terminal 1 around the x-axis, the y-axis, and the z-axis that are used as centers of rotation indicating the terminal state, the matching score, and the authentication result. The authentication result may indicate a successful authentication or a failed authentication.

As described above, this embodiment performs a preprocessing in which the fingerprint data managing unit 117, at the time of the fingerprint registration, manages the registered fingerprints within the storage device 12A by grouping the registered fingerprints having the manner of holding and the terminal state of the mobile terminal 1 that are similar, as illustrated in FIG. 9. For example, it is judged that the manners of holding are similar when the coordinate values of the manners of holding are similar within a predetermined range, and it is judged that the terminal state are similar when the direction and angle are similar within a predetermined range. In addition, the authentication result managing unit 121, at the time of the fingerprint authentication, stores the authentication results in the log within the storage device 12B, as illustrated in FIG. 11. As described above, this log includes the coordinate values of the contact positions as the manner of holding the mobile terminal 1, the terminal state of the mobile terminal 1, the matching score, and the authentication result at the time of the fingerprint authentication. The fingerprint data managing unit 117 uses the log to periodically compute the average value of the matching scores, and update the fingerprint data by setting the priority in the descending order of the average matching score, with respect to the registered fingerprints related to the manner of holding and the terminal state illustrated in FIG. 9. For example, the coordinate values (35, 60) and (60, 80) of the two contact positions P1 and P2 illustrated in FIGS. 5A and 5B are set to the manner of holding, H2, in FIG. 9, and the direction and angle (+40, −20, −20) of the mobile terminal 1 at the time of the fingerprint registration are set to the terminal state T2. In addition, the fingerprint F3 (ID 0001_0010) and the fingerprint F4 (ID 0001_0011) are related to the manner of holding, H2, and the terminal state T2, and registered. Further, as illustrated in FIG. 9, the registered fingerprints F3 and F4 are set in the descending order of the priority order in which the matching is performed using the computed average matching scores, with respect to the registered fingerprint having the manner of holding, H2, and the terminal state T2. The registered fingerprints F1 and F2 are similarly set in the descending order of the priority order in which the matching is performed using the computed average matching scores, with respect to the registered fingerprint having the manner of holding, H1, and the terminal state T1.

Next, when the user performs the fingerprint authentication, the fingerprint image is input from the fingerprint sensor 18 as illustrated in FIG. 5A, for example, and the fingerprint information acquiring unit 111 acquires the fingerprint image as an example of the fingerprint information. The holding-manner information acquiring unit 112 acquires the coordinate values (35, 60) and (60, 80) of the two contact positions P1 and P2 illustrated in FIG. 5A, for example, as an example of the holding-manner information. The terminal state acquiring unit 113 acquires the direction and angle (+40, −20, −20) of the mobile terminal 1 from the acceleration sensor 16 and the magnetic field sensor 17, as an example of the terminal state.

Next, the holding-manner evaluating unit 118 and the terminal state evaluating unit 119 compare the coordinate values (35, 60) and (60, 80) of the two contact positions P1 and P2 of the mobile terminal and the direction and angle (+40, −20, −20) of the mobile terminal 1 at the time of the fingerprint authentication with the manner of holding and the terminal state of the mobile terminal 1 related to the registered fingerprint ID 0001, respectively, and extract the manner of holding, H2, and the terminal state T2. Thereafter, the fingerprint matching method determining method 120 refers to the priority order of the registered fingerprints related to the manner of holding, H2, and the terminal state T2, to determine the extraction of the registered fingerprints that are the matching targets and determine the matching order of the extracted registered fingerprints. In this example, it is assumed for the sake of convenience that the manner of holding and the terminal state of the mobile terminal 1 at the time of the fingerprint authentication are similar to the manner of holding, H2, and the terminal state T2 illustrated in FIG. 9. Hence, when a reference is made to the priority order of the registered fingerprints related to the manner of holding, H2, and the terminal state T2, the priority order is in the descending order for the fingerprint F3, the fingerprint F4, or the like. Accordingly, with respect to the matching fingerprint data, the matching is performed in the order of the registered fingerprint F3, the registered fingerprint F4, or the like, in order to verify the identity of the user and record the log of the authentication result within the storage device 12B.

Hence, when verifying the identity of the user by the fingerprint authentication of the mobile terminal 1, the registered fingerprints that are to become the matching targets are extracted according to the manner of holding and the terminal state of the mobile terminal 1. In addition, in the case in which the number of users of the mobile terminal 1, the number of registered fingerprints, and the number of patterns of the changes in the manner of holding and the terminal state of the mobile terminal 1 at the time of the fingerprint registration are all small, this second embodiment, unlike the first embodiment described above, does not perform the fingerprint matching to extract the registered fingerprint data related to the manner of holding and the terminal state that are similar to the manner of holding and the terminal state of the mobile terminal 1 at the time of the fingerprint authentication, in order to perform the fingerprint matching process at a high speed.

According to this embodiment, when verifying the identity of the user using the fingerprint authentication of the mobile terminal 1, the registered fingerprints to be used for the fingerprint authentication are selected according to the manner of holding and the terminal state of the mobile terminal 1. For this reason, the registered fingerprints for which the manner of holding and the terminal state of the mobile terminal 1 at the time of the fingerprint registration greatly differ from those at the time of the fingerprint authentication can be excluded from the matching targets. Consequently, it is possible to suppress a deviation in the matching fingerprint from the registered fingerprint due to changes in the manner of holding and the terminal state of the mobile terminal 1 at the time of the fingerprint authentication from those at the time of the fingerprint registration, and reduce the failure of the fingerprint authentication.

(Third Embodiment)

In a third embodiment, a display function of the mobile terminal 1 is used when the fingerprint authentication fails in the first or second embodiment described above, in order to guide the user to employ an appropriate fingerprint input method for reducing failure of the biometric authentication, including an appropriate manner of holding the mobile terminal 1. The display function used to guide the user to employ the appropriate fingerprint input method is not limited to a particular display function. For example, the display function may display the positions (for example, two to four positions) on the side surface of the mobile terminal 1 where the user's hands are to make contact with the mobile terminal 1 on the display device 14, an illumination part (not illustrated) provided along the side surface of the mobile terminal 1, or the like.

Figure 12A:
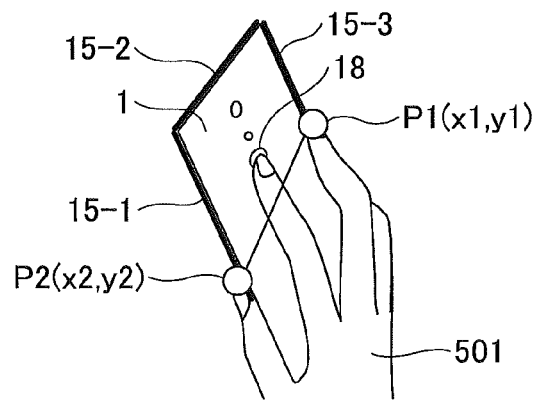
FIG. 12A is a diagram for explaining another example of the manner of holding the mobile terminal.
Figure 12B:
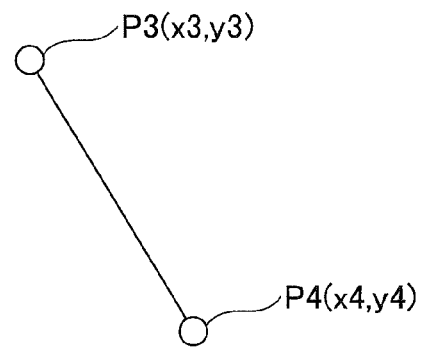
FIG. 12B is a diagram for explaining another example of the contact positions with respect to the mobile terminal.
Figure 12C:
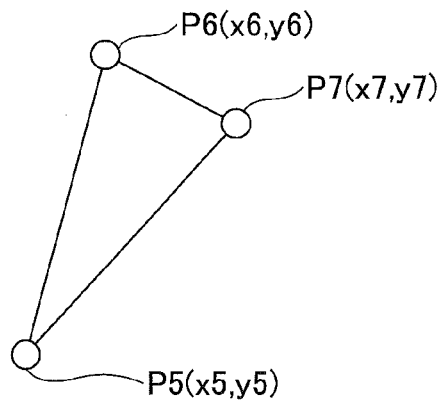
FIG. 12C is a diagram for explaining a further example of the contact positions with respect to the mobile terminal.

FIG. 12A is a diagram for explaining another example of the manner of holding the mobile terminal, FIG. 12B is a diagram for explaining another example of the contact positions with respect to the mobile terminal, and FIG. 12C is a diagram for explaining a further example of the contact positions with respect to the mobile terminal. In FIG. 12A, those parts that are the same as those corresponding parts in FIG. 5A are designated by the same reference numerals, and a description thereof will be omitted. In the example illustrated in FIG. 12A, a touch sensor 15-1 is provided on a left part of the side surface in the bottom view of the mobile terminal 1, a touch sensor 15-2 is provided on an upper part of the side surface in the bottom view of the mobile terminal 1, and a touch sensor 15-3 is provided on a right part of the side surface in the bottom view of the mobile terminal 1. A touch sensor (not illustrated) may be provided on a lower part of the side surface in the bottom view of the mobile terminal 1.

FIG. 12B illustrates an example in which, when the user holds the mobile terminal 1 at the contact positions P3, and P4 by the user's hand 501, the contact occurs at the position of the touch sensor 15-2 provided on the upper part of the side surface of the mobile terminal 1 where the coordinate values are (x3, y3) and at the position of the touch sensor 15-3 provided on the right part of the side surface of the mobile terminal 1 where the coordinate values are (x4, y4), in the bottom view of the mobile terminal 1.

FIG. 12C illustrates an example in which, when the user holds the mobile terminal 1 at contact positions P5, P6, and P7 by the user's hand 501, the contact occurs at the position of the touch sensor 15-1 provided on the right side of the side surface of the mobile terminal 1 where the coordinate values are (x5, y5), at the position of the touch sensor 15-2 provided on the upper part of the side surface of the mobile terminal 1 where the coordinate values are (x6, y6), and at the position of the touch sensor 15-3 provided on the right part of the side surface of the mobile terminal 1 where the coordinate values are (x7, y7), in the bottom view of the mobile terminal 1.

FIG. 13 is a flow chart for explaining an example of an input guiding process. In step S31 illustrated in FIG. 13, when the fingerprint authentication by the matching process unit 116 illustrated in FIG. 3 fails, the holding-manner evaluating unit 118, in step S32, evaluates a difference between the manner of holding at the time when the fingerprint authentication failed and each of the manners of holding that are managed as illustrated in FIG. 7 or FIG. 9, for example. More particularly, the difference in the manners of holding is computed from a distance between the coordinate values of the contact position and the coordinate values of the touch sensor 15 registered for each of two or more locations on the left part, the upper part, and the right part on the side surface of the mobile terminal 1 in the bottom view of the mobile terminal 1, as illustrated in FIG. 12A, for example. In the example illustrated in FIG. 12A, for example, when the coordinate values of the touch sensor 15 registered for the location on the right part of the side surface of the mobile terminal 1 in the bottom view of the mobile terminal 1 are (xr, yr), the distance to the coordinate values (x, y1) of the contact position can be computed from $\sqrt{\{(xr-x1)^2+(yr-y1)^2\}}$. In step S33, the holding-manner evaluating unit 118 judges whether the difference in the manners of holding is computed with respect to all locations of the touch sensor 15. The process returns to step S32 when the judgment result in step S33 is NO, and the process advances to step S34 when the judgment result in step S33 is YES.

In step S34, the terminal state evaluating unit 119 computes a difference in the directions and angles of the mobile terminal 1, as a difference in the terminal states of the mobile terminal 1. In a case in which the registered direction and angle with respect to the x-axis, the y-axis, and the z-axis are (xs, ys, zs), for example, the difference in the directions and angles of the mobile terminal 1 can be computed from a sum of the differences therefrom of the detected direction and angle (xd, yd, zd) with respect to the x-axis, the y-axis, and the z-axis, namely, $\{\sqrt{(xs-xd)^2}+\sqrt{(ys-yd)^2}+\sqrt{(zs-zd)^2}\}$, or from a sum of absolute values of the differences therefrom, namely, |xs−xd|+|ys−yd|+|zs−zd|. In step S35, the terminal state evaluating unit 119 judges whether the difference in the terminal states is computed with respect to all terminal states. The process returns to step S4 when the judgment result in step S35 is NO, and the process advances to step S36 when the judgment result in step S35 is YES.

In step S36, the holding-manner guide display unit 122 refers to the matching score of each manner of holding and each terminal state illustrated in FIG. 7 or FIG. 9. In step S37, the holding-manner guide display unit 122 extracts, from the manners of holding and the terminal states managed in FIG. 7 or FIG. 9, the manner of holding (that is, contact positions) and the terminal state (that is, direction and angle) for which the difference from those at the time of the fingerprint authentication that failed is small and the average value of the matching scores is high according to the evaluation described above. In step S38, the holding-manner guide display unit 122 notifies the extracted manner of holding (or contact positions) and terminal state (or direction and angle) to the user using the display function of the mobile terminal 1. The display function may display an arrow or the like on the display device 14 to indicate the contact positions on the side surface of the mobile terminal 1 where the user's hand is to make contact, or display position information such as coordinates of the contact positions on the display device 14, or illuminate only parts of the illumination part provided along the side surface of the mobile terminal 1 and corresponding to the contact positions, for example.

In the evaluation of the manner of holding and the evaluation of the terminal state at the time when the fingerprint authentication fails, the evaluation is based on the sum of the differences in the distances and the sum of the differences in the directions and angles, respectively, for each of the locations of the touch sensor 15 (at least two locations amongst the left part, the upper part, the right part, and the lower part on the side surface of the mobile terminal 1). However, the sums and the matching scores may be accumulated in the authentication results, and the manner of holding and the terminal state of the mobile terminal 1 may be evaluated by machine learning using only elements that affect the matching scores. In this case, instead of using the angles in the x-axis, y-axis, and z-axis directions for the evaluation of the terminal state, machine learning using the log of the accumulated authentication results may be used to evaluate the terminal state without computing the difference in the z-axis direction, in a case in which only the angles in the x-axis and y-axis directions affect the matching scores.

As described above, this embodiment performs a preprocessing in which the fingerprint matching is performed according to the fingerprint matching process of FIG. 4 or FIG. 10, and the log of the authentication results is accumulated as illustrated in FIG. 8 or FIG. 11. The log of the authentication results includes the timestamp, the fingerprint ID, the coordinate values of the contact positions indicating the manner of holding the mobile terminal 1, the rotating directions and the rotating angles of the mobile terminal 1 around the x-axis, the y-axis, and the z-axis that are used as centers of rotation indicating the terminal state, the matching score, and the authentication result. The authentication result may indicate a successful authentication or a failed authentication. In the example of the log of the authentication results illustrated in FIG. 11, the timestamp indicates that the fingerprint matching was performed on Jun. 15, 2014 at 8:10 and 50 seconds (2014.06.15.08.10.50), the registered fingerprints having the fingerprint IDs 0001_0001 and 0001_0002 were referred to as the matching targets, the matching scores for these registered fingerprints were 70 points and 60 points, respectively, and the authentication result indicated a successful authentication.

Next, the fingerprint data managing unit 117 uses the log of the authentication results to periodically compute the average value of the matching scores, and update the fingerprint data by setting the priority in the descending order of the average matching score, with respect to the registered fingerprints related to the manner of holding and the terminal state illustrated in FIG. 7 or FIG. 9. In this embodiment, the coordinate values (20, 20) and (80, 80) of the two contact positions P1 and P2 are set to the manner of holding, H1, the direction and angle (+30, —30, −30) of the mobile terminal 1 at the time of the fingerprint registration are set to the terminal state T1, and the average value of the matching score for this combination is 63 points. In this example, the coordinate values of the two contact positions P1 and P2 are acquired from the touch sensors 15-1 and 15-3 that are provided on the left side and the right side of the side surface of the mobile terminal 1, respectively. The manner of holding, the terminal state, the average value of the matching score, the registered fingerprint related thereto, the average value of the matching score, and the priority order may be accumulated as illustrated in FIG. 9, for example. In this example, the registered fingerprints related to the manner of holding, H1, and the terminal state T1 include the fingerprints having the fingerprint IDs 0001_0002 and 0001$_{\_0001}$, and the matching priority order of the fingerprints is the fingerprint IDs 0001_0002 and 0001_0001 in this order. Similarly, the coordinate values (35, 60) and (60, 80) of the two contact positions P1 and P2 are set to the manner of holding, H2, the direction and angle (+40, −20, −20) of the mobile terminal 1 at the time of the fingerprint registration are set to the terminal state T2, and the average value of the matching score for this combination is 69 points. In addition, as illustrated in FIG. 9, the registered fingerprint F3 (ID 0001_00010) and the registered fingerprint F4 (ID 0001_0011) are registered in a manner related to the manner of holding, H2, and the terminal state T2. The matching priority order of the registered fingerprints F3 and F4 is the fingerprint IDs 0001_0010 and 0001_0011 in this order.

Next, when the fingerprint authentication fails, the difference in the manners of holding and the difference in the terminal states are computed. In this example, information on the manner of holding of the mobile terminal includes the coordinate values (36, 61) and (60, 81) of the two contact positions P1 and P2, and information on the terminal state includes the direction and angle (+41, −20, −20), at the time of the failure of the fingerprint authentication. In the case in which the manner of holding, H1, and the terminal state T1 are as illustrated in FIG. 9, and the contact position acquired from the touch sensor 15-1 provided on the left side on the side surface of the mobile terminal 1 is (20, 20), for example, the difference in the manners of holding can be computed from $\sqrt{\{(36-20)^2+(61-20)^2\}} \approx 25$. In addition, in the case in which the contact position acquired from the touch sensor 15-3 provided on the right side on the side surface of the mobile terminal 1 is (70, 80), for example, the difference in the manners of holding can be computed from $\sqrt{\{(60-70)^2+(81-80)^2\}} \approx 10$. A sum of these differences becomes 25+10=30. Similarly, in the case in which the manner of holding, H1, and the terminal state T1 are as illustrated in FIG. 9, a sum of the differences in the directions and angles of the mobile terminal 1 when the fingerprint authentication fails can be computed from $\sqrt{\{+41-(+30)\}^2+\sqrt{\{-20-(-30)\}^2}+\sqrt{\{-20-(-30)\}^2}}=11+10+10=31$.

Next, the differences in the manner of holding and the terminal state of the mobile terminal 1 at the time when the fingerprint authentication fails and the manner of holding, H2, and the terminal state T2 illustrated in FIG. 9 are computed in a manner similar to the above. The difference in the manners of holding can be computed from a sum of $\sqrt{\{(36-35)^2+(61-60)^2\}} \approx 1$ and $\sqrt{/\{(60-60)^2+(81-90)^2\}} \approx 1$, which is 1+1=2. On the other hand, the difference in the terminal states can be computed from a sum of $\sqrt{\{+41-(+40)\}^2}+\sqrt{\{-20-(-20)\}^2}+\sqrt{\{-20-(-20)\}^2}=1+0+0=1$. Next, data having a small difference in the manners of holding, a small difference in the terminal states, and a high average value of the matching scores is extracted from the data illustrated in FIG. 9, for example. In this example, the sum of the differences in the case in which the manner of holding is H1 and the terminal state is T1 with respect to those at the time when the fingerprint authentication fails is 30+31=61 as computed above, and the sum of the differences in the case in which the manner of holding is H2 and the terminal state is T2 with respect to those at the time when the fingerprint authentication fails is 1+1=2 as also computed above. In addition, the average value of the matching scores is 63 points for the case in which the manner of holding is H1 and the terminal state is T1 in FIG. 9, and the average value of the matching scores is 69 points for the case in which the manner of holding is H2 and the terminal state is T2 in FIG. 9. Accordingly, the holding-manner guide display unit 122 displays the coordinate values (35, 60) of the contact position on the left side of the side surface of the mobile terminal 1 and the coordinate values (60, 80) of the contact position on the right side of the side surface of the mobile terminal 1 as the contact positions of the manner of holding, H2, of the mobile terminal 1 in FIG. 9, on the display device 14 using the display function. Further, the holding-manner guide display unit 122 displays the direction and angle (+40, −20, −2) of the mobile terminal 1 as the terminal state T2 of the mobile terminal 1 in FIG. 9, on the display device 14 using the display function. As a result, the holding-manner guide display unit 122 can guide the user to employ the appropriate fingerprint input method when the fingerprint authentication fails.

According to this embodiment, when the fingerprint authentication fails when verifying the identity of the user using the fingerprint authentication of the mobile terminal 1, the matching score and the manner of holding and the terminal state of the mobile terminal 1 included in past authentication results are used to evaluate differences with the manner of holding and the terminal state of the mobile terminal 1 at the time when the fingerprint authentication fails. Hence, the LCD, the illumination part, or the like of the mobile terminal 1 can be used to guide the user to re-do the input of the fingerprint image according to the evaluation results, so that the matching score easily becomes high and the changes from the manner of holding and the terminal state at the time when the fingerprint authentication fails become small. Therefore, the convenience of the fingerprint authentication to the user can be maintained.

According to each of the embodiments described above, it is possible to reduce the failure of the biometric authentication, regardless of the manner of holding the mobile terminal by the user.

In addition, in each of the embodiments described above, the biometric authentication is not limited to the authentication of the fingerprint pattern, and the biometric authentication may include authentication of the vein pattern of the palm, the vein pattern of the finger, the palm-print pattern, the iris pattern of the eye, or the like. In the authentication of the vein pattern of the palm, not only the manner of holding and the terminal state of the mobile terminal, but also the relation of the manner of holding and the terminal state of the mobile terminal with respect to a manner in which the user's hand (that is, palm) is placed over the mobile terminal may be evaluated, in order to determine the matching method or the guiding method to urge the user to re-do the input when the biometric authentication fails.

The description above use terms such as "determine", or the like to describe the embodiments, however, such terms are abstractions of the actual operations that are performed. Hence, the actual operations that correspond to such terms may vary depending on the implementation, as is obvious to those skilled in the art.

Although the embodiments are numbered with, for example, "first," "second," or "third," the ordinal numbers do not imply priorities of the embodiments. Many other variations and modifications will be apparent to those skilled in the art.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A biometric authentication apparatus to perform a biometric authentication in a terminal, comprising:
   a storage device configured to store a program, and registered data including registered biometric data related to manners of holding the terminal and postures of the terminal; and
   a processor configured to execute the program stored in the storage device and perform a process including
      acquiring matching data detected at a time of a biometric authentication and including a matching biometric data, a manner of holding the terminal, and a posture of the terminal,
      performing a matching process by comparing the matching data and the registered data registered in the storage device, to extract the registered data including the manner of holding the terminal and the posture of the terminal that are similar to the manner of holding the terminal and the posture of the terminal included in the matching data, and judge a successful biometric authentication when a similarity of the registered biometric data included in the extracted registered data with respect to the matching biometric data is greater than or equal to a first threshold value, and
      displaying a guide on a biometric input method that includes a manner of holding the terminal for reducing failure of the biometric authentication, when the performing judges a failure of the biometric authentication.

2. A biometric authentication apparatus to perform a biometric authentication in a terminal, comprising:
   a storage device configured to store a program, and registered data including registered biometric data related to manners of holding the terminal and postures of the terminal; and
   a processor configured to execute the program stored in the storage device and perform a process including
      acquiring matching data detected at a time of a biometric authentication and including a matching biometric data, a manner of holding the terminal, and a posture of the terminal,
      performing a matching process by comparing the matching data and the registered data registered in the storage device, to extract the registered data including the manner of holding the terminal and the posture of the terminal that are similar to the manner of holding the terminal and the posture of the terminal included in the matching data, and judge a successful biometric authentication when a similarity of the registered biometric data included in the extracted registered data with respect to the matching biometric data is greater than or equal to a first threshold value,
      first acquiring the manner of holding the terminal from a touch sensor that detects contact position information of the terminal where a user makes contact with the terminal, and second acquiring the posture of the terminal from an acceleration sensor that detects rotating directions of the terminal around axes of a polar coordinate system that are used as centers of rotation, and a magnetic field sensor that detects rotating angles of the terminal around the axes of the polar coordinate system that are used as the centers of rotation.

3. A biometric authentication apparatus to perform a biometric authentication in a terminal, comprising:
  a storage device configured to store a program, and registered data including registered biometric data related to manners of holding the terminal and postures of the terminal; and
  a processor configured to execute the program stored in the storage device and perform a process including
    acquiring matching data detected at a time of a biometric authentication and including a matching biometric data, a manner of holding the terminal, and a posture of the terminal,
    performing a matching process by comparing the matching data and the registered data registered in the storage device, to extract the registered data including the manner of holding the terminal and the posture of the terminal that are similar to the manner of holding the terminal and the posture of the terminal included in the matching data, and judge a successful biometric authentication when a similarity of the registered biometric data included in the extracted registered data with respect to the matching biometric data is greater than or equal to a first threshold value, wherein the performing extracts the registered data including the registered biometric data having a similarity greater than or equal to a second threshold value smaller than the first threshold value with respect to the matching biometric included in the matching data, and compares the manner of holding the terminal and the posture of the terminal included in the registered data with the manner of holding the terminal and the posture of the terminal included in the matching data,
    first evaluating a manner of holding the terminal at the time of the biometric authentication by comparing the manner of holding the terminal included in the matching data and the manner of holding the terminal related to the registered biometric data stored in the storage device,
    second evaluating a posture of the terminal at the time of the biometric authentication by comparing the posture of the terminal included in the matching data and the posture of the terminal related to the registered biometric data stored in the storage device, and
    determining extracting of the registered biometric data that are matching targets and a matching order of the extracted registered biometric data, by referring to a priority order of the registered biometric data related to the evaluated manner of holding the terminal evaluated by the first evaluating and the evaluated posture of the terminal evaluated by the second evaluating.

4. A biometric authentication apparatus to perform a biometric authentication in a terminal, comprising:
  a storage device configured to store a program, and registered data including registered biometric data related to manners of holding the terminal and postures of the terminal; and
  a processor configured to execute the program stored in the storage device and perform a process including
    acquiring matching data detected at a time of a biometric authentication and including a matching biometric data, a manner of holding the terminal, and a posture of the terminal,
    performing a matching process by comparing the matching data and the registered data registered in the storage device, to extract the registered data including the manner of holding the terminal and the posture of the terminal that are similar to the manner of holding the terminal and the posture of the terminal included in the matching data, and judge a successful biometric authentication when a similarity of the registered biometric data included in the extracted registered data with respect to the matching biometric data is greater than or equal to a first threshold value,
    accumulating and managing results of the biometric authentication, and
    managing the registered biometric data stored in the storage device, including newly registering biometric data and updating or deleting the registered biometric data,
  wherein the managing manages the registered biometric data by adding a priority order, in correspondence with a relation of the manner of holding the terminal, the posture of the terminal, and a matching score.

5. A biometric authentication method to perform a biometric authentication in a terminal, comprising:
  acquiring, by a processor of the terminal, matching data detected at a time of a biometric authentication and including a matching biometric data, a manner of holding the terminal, and a posture of the terminal; and
  performing, by the processor, a matching process by comparing the matching data and registered data registered in a storage device, wherein the registered data include registered biometric data related to manners of holding the terminal and postures of the terminal,
  wherein the performing includes
    extracting the registered data including the manner of holding the terminal and the posture of the terminal that are similar to the manner of holding the terminal and the posture of the terminal included in the matching data, and
    judging a successful biometric authentication when a similarity of the registered biometric data included in the extracted registered data with respect to the matching biometric data is greater than or equal to a first threshold value; and
  displaying, by the processor, a guide on a biometric input method that includes a manner of holding the terminal for reducing failure of the biometric authentication, when the performing judges a failure of the biometric authentication.

6. The biometric authentication method as claimed in claim 5, further comprising:
  first acquiring, by the processor, the manner of holding the terminal from a touch sensor that detects contact position information of the terminal where a user makes contact with the terminal; and
  second acquiring, by the processor, the posture of the terminal from an acceleration sensor that detects rotating directions of the terminal around axes of a polar coordinate system that are used as centers of rotation, and a magnetic field sensor that detects rotating angles of the terminal around the axes of the polar coordinate system that are used as the centers of rotation.

7. The biometric authentication method as claimed in claim 5, further comprising:
- accumulating and managing, by the processor, results of the biometric authentication; and
- managing, by the processor, the registered biometric data stored in the storage device, including newly registering biometric data and updating or deleting the registered biometric data,
- wherein the managing manages the registered biometric data by adding a priority order, in correspondence with a relation of the manner of holding the terminal, the posture of the terminal, and a matching score.

8. A non-transitory computer-readable storage medium having stored therein a program which, when executed by a computer, causes the computer to perform a process comprising:
- acquiring matching data detected at a time of a biometric authentication and including a matching biometric data, a manner of holding the terminal, and a posture of the terminal;
- performing a matching process by comparing the matching data and registered data registered in a storage device, wherein the registered data include registered biometric data related to manners of holding the terminal and postures of the terminal,
- wherein the performing includes
  - extracting the registered data including the manner of holding the terminal and the posture of the terminal that are similar to the manner of holding the terminal and the posture of the terminal included in the matching data, and
  - judging a successful biometric authentication when a similarity of the registered biometric data included in the extracted registered data with respect to the matching biometric data is greater than or equal to a first threshold value; and
- displaying a guide on a biometric input method that includes a manner of holding the terminal for reducing failure of the biometric authentication, when the performing judges a failure of the biometric authentication.

9. The non-transitory computer-readable storage medium as claimed in claim 8, wherein the process further comprises:
- first acquiring the manner of holding the terminal from a touch sensor that detects contact position information of the terminal where a user makes contact with the terminal; and
- second acquiring the posture of the terminal from an acceleration sensor that detects rotating directions of the terminal around axes of a polar coordinate system that are used as centers of rotation, and a magnetic field sensor that detects rotating angles of the terminal around the axes of the polar coordinate system that are used as the centers of rotation.

10. The non-transitory computer-readable storage medium as claimed in claim 8, wherein the process further comprises:
- accumulating and managing results of the biometric authentication; and
- managing the registered biometric data stored in the storage device, including newly registering biometric data and updating or deleting the registered biometric data,
- wherein the managing manages the registered biometric data by adding a priority order, in correspondence with a relation of the manner of holding the terminal, the posture of the terminal, and a matching score.

* * * * *